United States Patent [19]

Jurga et al.

[11] Patent Number: 5,118,190
[45] Date of Patent: Jun. 2, 1992

[54] SAGNAC-TYPE FIBER-OPTIC GYROSCOPE

[75] Inventors: Peter Jurga, Munich; Hans Poisel, Dachau; Gert Trommer, Munich, all of Fed. Rep. of Germany

[73] Assignee: Messerschmitt-Bölkow-Blohm GmbH, Fed. Rep. of Germany

[21] Appl. No.: 564,754

[22] Filed: Aug. 9, 1990

[30] Foreign Application Priority Data

Aug. 9, 1989 [DE] Fed. Rep. of Germany ....... 3926313

[51] Int. Cl.[5] .............................................. G01C 19/72
[52] U.S. Cl. ...................................... 356/350; 385/14
[58] Field of Search ...................... 356/350; 350/96.15; 385/14

[56] References Cited

U.S. PATENT DOCUMENTS 4,440,498 4/1984 Sheem ................................. 356/350
4,573,797 3/1986 Burns et al. ........................ 356/350
4,822,128 4/1989 Imoto et al. ..................... 350/96.15

Primary Examiner—Samuel A. Turner
Assistant Examiner—Richard E. Kurtz, II
Attorney, Agent, or Firm—Evenson, Wands, Edwards, Lenahan & McKeown

[57] ABSTRACT

A Sagnac-type fiber-optic gyroscope having a light source, a fiber coil consisting of an optical fiber, a receiver arrangement which are all connected with gates of a directional coupler, in which the light fed into the fiber coil interferes with the light emerging from the fiber coil in a coupling area and the rate of rotation of the fiber-optic gyroscope is determined from the interference signals. In order to achieve a working point which is situated in or close to the quadrature point, the directional coupler is developed as a 4×4 coupler between the arms of which fixed phase relations are provided in the coupling area.

10 Claims, 2 Drawing Sheets

SAGNAC-TYPE FIBER-OPTIC GYROSCOPE

BACKGROUND AND SUMMARY OF THE INVENTION invention relates to a fiber-optic gyroscope of the type having a light source coupled through a directional coupler to a fiber optic coil. Light from the light source is split into two beams which circulate in opposite directions through the fiber optic coil, and the phase of the output signals is analyzed to determine the rate of rotation of the gyroscope.

A fiber-optic gyroscope of this type is disclosed in U.S. Pat. No. 4,440,498, in which the directional coupler has six gates arranged in groups of three on both sides of a coupling area. The coupling area in this case may be generated by the pressing or melting of optical fibers disposed next to one another. A light source and two receiver diodes arranged symmetrically on either side of the light source are connected on one side of the directional coupler. On the other side, a fiber coil consisting of a long optical fiber is connected to the outer gates, the center gate, which is opposite the connection for the light source, remaining free and being connectable, for example, with a monitoring circuit in which fluctuations of the intensity of the light source are determined and are taken into account in the measuring results of the fiber-optic gyroscope.

This known fiber-optic gyroscope works as a result of the special development of the directional coupler close to the so-called quadrature point, in which the output signals of the receiver diodes have a sinusoidal dependence on the Sagnac phase so that this fiber-optic gyroscope has maximum sensitivity at low rates of rotation.

Conventional fiber-optic gyroscopes which work with 2×2 couplers, i.e., directional couplers with two gates respectively on each side of the coupling area, furnish output signals which depend on the cosine of the Sagnac phase. No differentiation can therefore be made between a positive and a negative rotating direction of the gyroscope. In order to obtain a sensitivity to low rates of rotation in this case, a non-reciprocal phase shifting by pi/2 must be generated at one end of the fiber coil, for example, by phase modulation, so that the cosine dependence of the interference signal becomes a sine dependence. The disadvantage of this type arrangement is the required additional modulator which operates, for example, piezomechanically or electro-optically.

It is an object of the invention to provide a fiber-optic gyroscope of the above-mentioned type which automatically operates in proximity of the quadrature point.

According to the invention, this object is achieved by using an eight-gate directional coupler having four arms respectively leading to gates on both sides of the coupling area, the power distribution to the four output gates taking place with a specific relative phase shifting between the output signals of the coupler. As a result of such defined phase relations between the output amplitudes of the directional coupler, the operating point of the fiber-optic gyroscope may be placed in the quadrature point.

The directional coupler is preferably made of four monomode fibers which rest against one another in the coupling area and are melted on by uniform heating. In this case, the resulting coupling area is preferably drawn as a biconical taper. Before the melting-on, the monomode fibers may also be twisted together in the coupling area. As a result of these measures, particularly by the tapering of the four fiber cores in the coupling area generated by the biconical drawing, the light guided in the fiber cores by total reflection is guided with less power. By means of such an evanescent coupling of the amplitudes lapping into the cladding area of the optical fibers to the adjacent fibers cores, the desired distribution of energy takes place between the four optical fibers. The characteristic of the 4×4 coupler which is essential for the desired method of operation of the fiber-optical gyroscope in or close to the quadrature point, in addition to the power distribution to the four outputs, is a specific relative phase shifting between the output signals of the 4×4 coupler.

The advantage of such a 4×4 coupler in comparison to a known 3×3 coupler is the fact that the signal of the additional receiver can also be used directly for the detection of the rate of rotation which, in the case of a 3×3 coupler, would be possible only by means of an additional 2 ×2 coupler which would branch off the light reflected into the light source to an additional receiver.

Other objects, advantages and novel features of the present invention will become apparent from the following detailed description of the invention when considered in conjunction with the accompanying drawings.

DETAILED DESCRIPTION OF THE DRAWINGS

Figure 1:
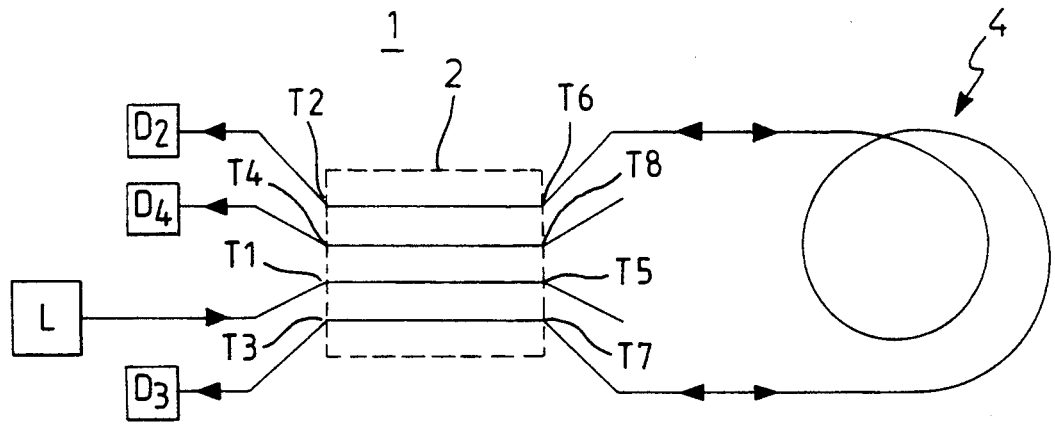
FIG. 1 is a schematic representation of a fiber-optic gyroscope according to the invention having a 4×4 coupler.
Figure 2:
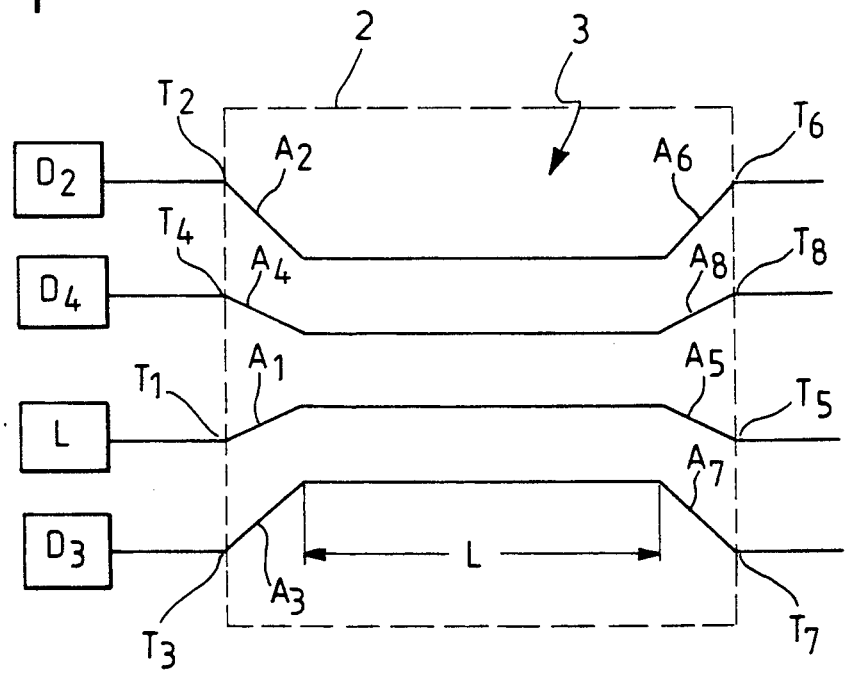
FIG. 2 is a more detailed schematic representation of the 4×4 coupler.
Figure 3:
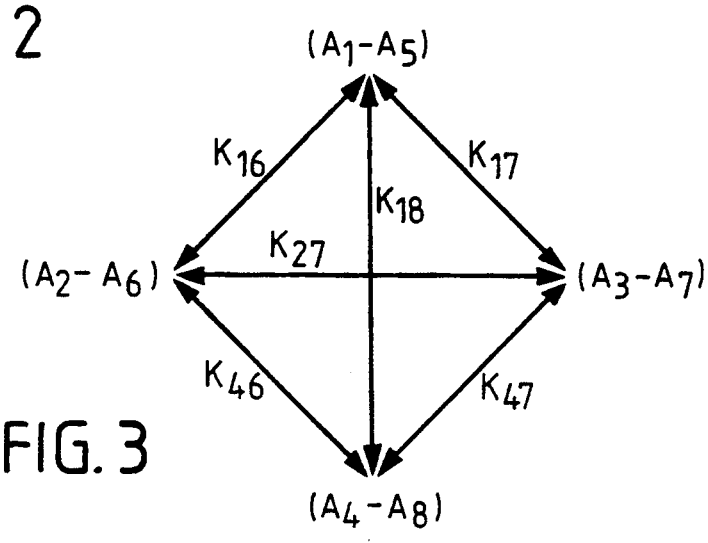
FIG. 3 is a schematic representation of the coupling constant between the individual arms of the coupler shown in FIG. 2.

Referring to FIGS. 1 and 2, fiber-optic gyroscope 1 has a 4×4 directional coupler 2 which has four gates on both its sides, $T_1$ to $T_4$ and $T_5$ to $T_8$ respectively, the assigned arms $A_1$ to $A_4$ and $A_5$ to $A_8$ of which each lead to a coupling area 3 in which they are connected with one another. A light source L is connected with gate $T_1$; gates $T_2$, $T_3$, and $T_4$ are connected to receiver diodes $D_2$, $D_3$ and $D_4$. Gates $T_6$ and $T_7$ situated on the opposite side are connected with a fiber coil 4 consisting of a long monomode optical fiber 5. Gates $T_5$ and $T_8$ remain open or are connected with monitoring circuits by means of which, for example, the intensity of the light source is tested and taken into account in the measuring results.

The light source L preferably emits unpolarized light in a wide-band frequency range. In the coupling area 3, this light is uniformly distributed on the two gates $T_6$ and $T_7$ with which the two ends of the fiber coil are connected so that the split-up light fractions travel through the fiber coil 4 in opposite directions. After passing through the fiber coil 4, the light, again through gates $T_6$ and $T_7$, enters the directional coupler 2 and interferes in the coupling area 3. The interference signal is guided to the receiving diodes $D_2$, $D_3$ and $D_4$ from the output signals of which the rate of rotation of the fiber-optic gyroscope is determined.

Figure 4:
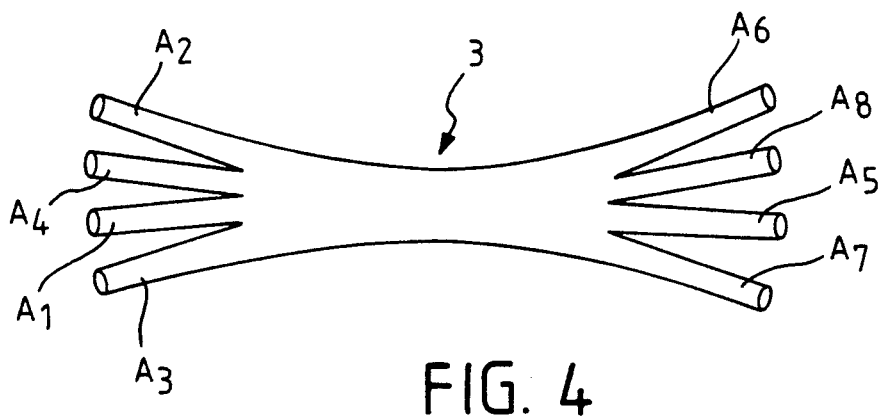
FIG. 4 is a schematic representation of a biconically shaped coupler.

The directional coupler 2 is, for example, produced in such a manner that four monomode optical fibers in the coupling area are twister together and carefully heated so that they melt to one another. During the melting-on, the arrangement is drawn such that the coupling area obtains a biconical shape corresponding to FIG. 4, the thinnest point of which is situated in the center of the coupling area 3. The four optical fibers at both ends of the fused-together coupling area will then form arms $A_1$ to $A_4$ and $A_5$ to $A_8$.

While a known 3×3 directional coupler must be constructed as symmetrically as possible in order to have a high sensitivity for measuring low rates of rotation, for the purpose of which all three coupling constants have the same size and the coupling length is selected such that the energy distribution on the three arms of the directional coupler amounts to one third respectively, the 4×4 directional coupler 2 according to the invention must have an asymmetric power distribution so that the receiving signals do not depend on a pure cosine function of the Sagnac phase. A high sensitivity of the fiber-optic gyroscope 1 for the operation close to the quadrature point, i.e., for the measuring of low rates of rotation, is obtained, for example, for the following products from the coupling length L of the coupling area 3 and the coupling constants $K_{ij}$:

$$K_{16}L = K_{17}L = K_{46}L = K_{47}L = K_{27}L = pi/6;$$
$$K_{18}L = pi/12.$$

Figure 5:
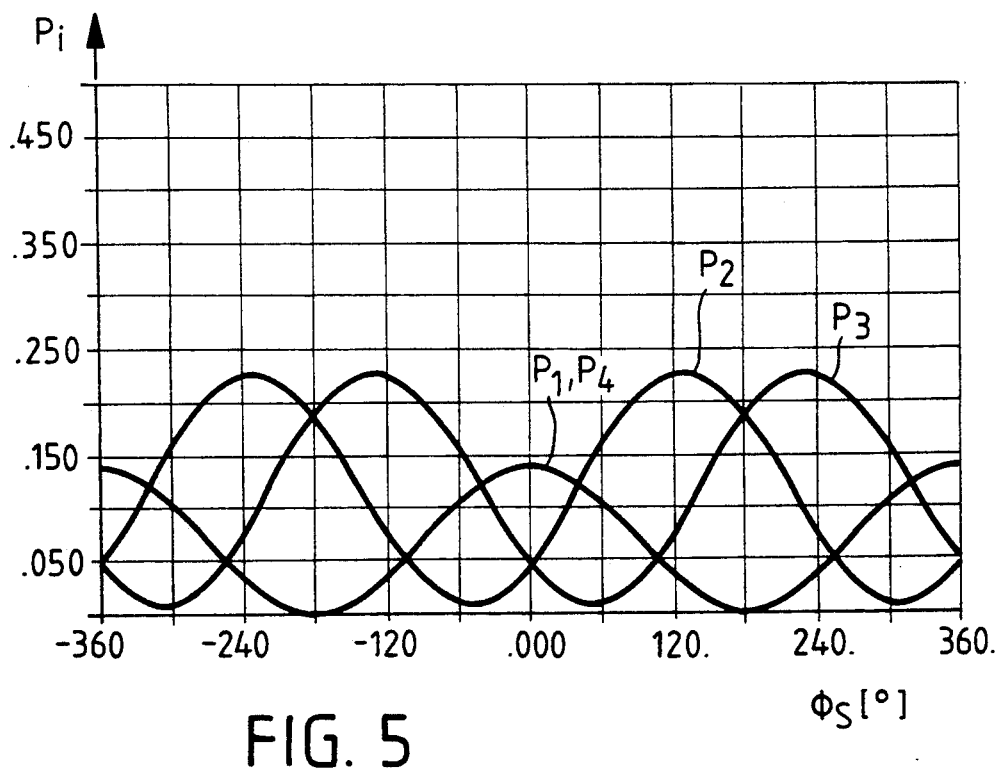
FIG. 5 is a signal diagram of the output signals of receivers of the fiber-optic gyroscope according to the invention.

The indices i and j of the coupling constants correspond to the indices of gates $T_k$ or arms $A_k$ so that, for example, coupling constant $K_{16}$ represents the coupling between arms $A_1$ and $A_6$ in coupling area 3. From these products, the output signals $P_1$, $P_2$, $P_3$ and $P_4$ shown in FIG. 5 are obtained at gates $T_1$ to $T_4$, specifically:

$P_1 = 0.0694 + 0.0694$ cos $Phi_s$
$P_4 = 0.0694 + 0.0694$ cos $Phi_s$
$P_2 = 0.1169 - 0.1099$ cos $(Phi + 50.8°)$
$P_3 = 0.1169 - 0.1099$ cos $(Phi - 50.8°)$.

It is shown that the output signals $P_2$ and $P_3$ of receiving diodes $D_2$ and $D_3$ are, in each case, definite around the zero value of the rate of rotation because they follow a sine course there so that the fiber-optic gyroscope operates in the quadrature point. The cosine-dependent signal $P_4$ may additionally be used for the detection. The transmission matrix S, which describes the transmission from input $e_i$ to output $a_j$, (i, j = 1 ..., 4)

$$a_j = \sum_{i=1}^{4} s_{ji} e_i$$

has the following components:

| | +j6,6° | | −j112,5° | | −j112,5° | | −j143,5° |
|---|---|---|---|---|---|---|---|
| 0,542e | | 0,186e | | 0,186e | | 0,085e | |
| | −j112,5° | | +j9,4° | | −j119,8° | | −112,5° |
| 0,186e | | 0,421e | | 0,206e | | 0,186e | |
| | −j112,5° | | −j119,8° | | +j9,4° | | −112,5° |
| 0,186e | | 0,206e | | 0,421e | | 0,186e | |
| | −j143,5° | | −j112,5° | | −j112,5° | | +j6,6° |
| 0,085e | | 0,186e | | 0,186e | | 0,542e | |

It is therefore essential that the directional coupler has fixed defined phase relations between its output amplitudes and does not just represent a power distributor without any fixed phase relations.

Although the invention has been described and illustrated in detail, it is to be clearly understood that the same is by way of illustration and example, and is not to be taken by way of limitation. The spirit and scope of the present invention are to be limited only by the terms of the appended claims.

We claim:
1. A fiber optic gyroscope comprising:
a light source;
a fiber optic coil;
said light source being optically coupled to said fiber optic coil by a directional coupler having an asymmetric power distribution as between respective pairs of gates thereof, whereby output signals therefrom are characterized by a predetermined phase shift;
and means for detecting the phase of said output signals.

2. The apparatus according to claim 1, wherein said directional coupled is an eight gate 4×4 coupler comprised of four monomode fibers melted together in the coupling area and said coupling area is drawn as a biconical taper.

3. A fiber-optic gyroscope comprising:
a light source;
a receiver means for detecting light received thereby;
a fiber coil consisting of an optical fiber having two ends;
a directional coupler having a coupling area and a set of first gates on a first end of said coupling area and a set of second gates on a second end of said coupling ares, each combination of one of said first gates and one of said second gates having a coupling constant associated therewith;
said light source and said receiver means being connected to said first gates and said fiber coil being connected to said second gates in such a manner that light from said light source is fed into the two ends of said fiber coil and passes through said fiber coil in opposite directions, the light emerging from the respective ends of the fiber coil in the directional coupler and interfering in said coupling area to form an interference signal which is received by the receiver means;
said directional coupler being a monomode eight gate 4×4 coupler having fixed phase relations as between said first and second gates, wherein said coupling constants between said first and second gates and the length of the coupling area are selected such that an asymmetric power distribution is achieved, and operation of the fiber optic gyro is obtained in or approximately at the quadrature point.

4. A fiber-optic gyroscope according to claim 3, wherein the products of coupling length and the coupling constants between individual pairs of gates of the directional coupler are selected differently such that the signals received by the receivers means do not depend on a pure cosine function.

5. A fiber-optic gyroscope according to claim 4, wherein the products of coupling lengths and the coupling constant between the pairs of gates of the 4×4 coupler are selected such that the power distribution to said second gates is non-uniform when coupled into one of the said first gates.

6. A fiber-optic gyroscope according to claim 5, wherein the light source is connected with one of said first gates of the directional coupler, wherein said receiver means comprises three separate receivers, each being connected to a different one of said first gates, wherein two of said second gates are connected with the ends of the fiber coil and the other output gates are open, wherein the products of said coupling constants and the coupling length for the connections between the light source and the fiber coil, between one of the receivers and the fiber coil, and between another receiver and an end of the fiber coil have a first identical value, wherein such product for the connection between light source and one of the open output gates has a second value which differs from the first value.

7. A fiber-optic gyroscope according to claim 6, wherein the first value is pi/6 and the second value is pi/12.

8. A fiber-optic gyroscope according to claim 3, wherein the directional coupler is produced from four monomode fibers which are disposed against one another in the coupling area and are melted to one another.

9. A fiber-optic gyroscope according to claim 8, wherein coupling area has a biconical shape.

10. A fiber-optic gyroscope according to claim 9, wherein the monomode fibers are twisted together with one another before the heating and melting-together of the coupling area.

* * * * *